G. T. Jobson,

Hoe.

No. 98,598. Patented Jan. 4. 1870.

Witnesses:
E. Wolff
Jno. K. Brook

Inventor:
G. T. Jobson
per Mmm
Attorneys.

GILES T. JOBSON, OF MACON, GEORGIA.

Letters Patent No. 98,598, dated January 4, 1870.

IMPROVEMENT IN HOES.

The Schedule referred to in these Letters Patent and making part of the same.

*To all whom it may concern:*

Be it known that I, GILES T. JOBSON, of Macon, in the county of Bibb, and State of Georgia, have invented a new and useful Improvement in Attaching Hoes and other Tools to Handles; and I do hereby declare that the following is a full, clear, and exact description thereof, which will enable others skilled in the art to make and use the same, reference being had to the accompanying drawings, forming part of this specification.

This invention relates to improvement in hoes and similar implements; and

It consists in providing the same with sections of tubular shanks, as hereinafter specified.

Similar letters of reference indicate corresponding parts.

Figure 1:
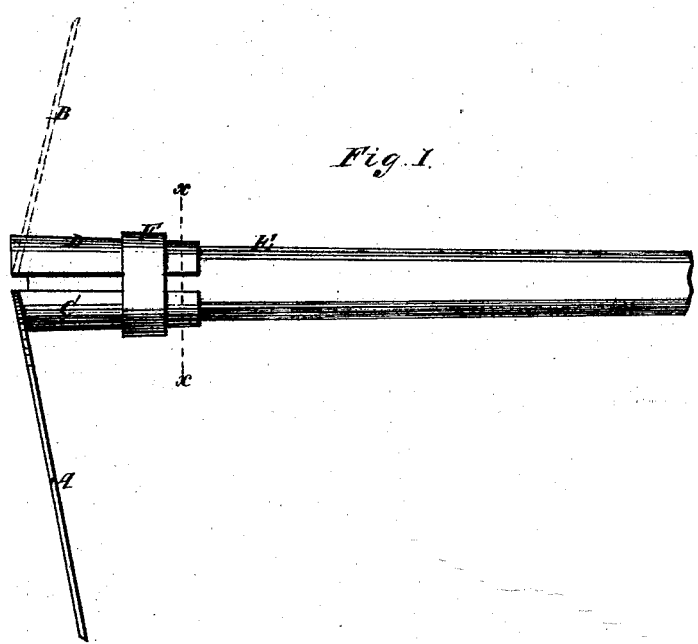
Figure 1 represents a side elevation of my improved tool.
Figure 2:
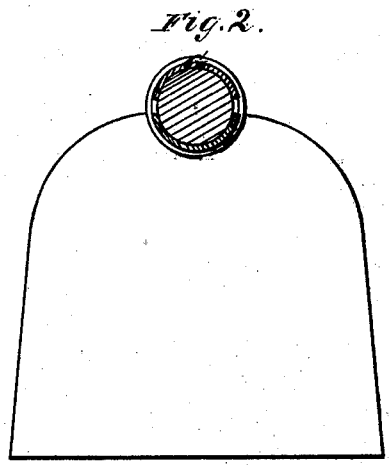
Figure 2 represents a section of the same, taken on the line x x of fig. 1.

A is the hoe, and B, the rake or other tool, each of which is provided with a metal shank, C, D representing, in form, a longitudinal section of a tube slightly tapered.

These shanks are placed on the handle E, as represented in the drawings, and secured thereto by the clamping-ring F, driven from the upper end down toward the lower end, which is the largest, thereby firmly clamping them to the handle in a simple and efficient way, attaching two tools to one shank; or, if only one tool is required, I substitute a half ferrule, G, in the place of the shank of one tool.

Having thus described my invention,

I claim as new, and desire to secure by Letters Patent—

A hoe (or similar implement) provided with a sectional tubular shank, C, as and for the purpose specified.

GILES T. JOBSON.

Witnesses:
GRENVILLE WOOD,
JOHN J. FORSYTH.